United States Patent

Kanai

Patent Number: 5,145,751
Date of Patent: Sep. 8, 1992

[54] MAGNETIC RECORDING MEDIUM COMPRISING MAGNETIC PARTICLES AND A BINDER AND A DIOXOLANE ESTER LUBRICANT

[75] Inventor: Hiroyuki Kanai, Tochigi, Japan

[73] Assignee: Kao Corporation, Tokyo, Japan

[21] Appl. No.: 535,481

[22] Filed: Jun. 11, 1990

[30] Foreign Application Priority Data

Jun. 26, 1989 [JP] Japan .................. 1-162882

[51] Int. Cl.⁵ .................................................. G11B 5/00
[52] U.S. Cl. ..................... 428/694; 428/695; 428/900; 428/64
[58] Field of Search ............... 428/900, 694, 695, 64; 549/430; 252/56 R

[56] References Cited

U.S. PATENT DOCUMENTS

| | | | |
|---|---|---|---|
| 2,701,253 | 2/1955 | Jones et al. | 260/327 |
| 3,470,206 | 9/1969 | Martin et al. | 260/327 |
| 3,900,411 | 8/1975 | Andress, Jr. et al. | 252/52 R |
| 3,910,845 | 10/1975 | Coon | 252/56 R |
| 3,954,716 | 5/1976 | Muller et al. | 260/75 R |
| 4,696,869 | 9/1987 | Funahashi et al. | 428/695 |
| 4,792,411 | 12/1988 | Walsh | 252/45 |
| 4,906,253 | 3/1990 | Walsh | 44/63 |

FOREIGN PATENT DOCUMENTS 57-27433 2/1982 Japan .
61-32291 2/1988 Japan .
WO88/05071 7/1988 PCT Int'l Appl. .

OTHER PUBLICATIONS

European Search Report.

Primary Examiner—Paul J. Thibodeau
Assistant Examiner—Stevan A. Resan
Attorney, Agent, or Firm—Birch, Stewart, Kolasch & Birch

[57] ABSTRACT

The magnetic recording medium which comprises a non-magnetic substrate and a magnetic recording layer, coated on the substrate, said layer comprising a compound having the formula (1):

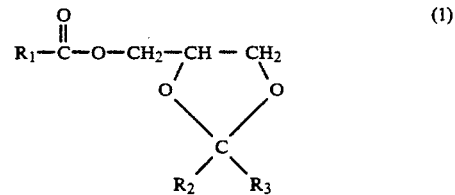

in which $R_1$ is an alkyl having 11 to 31 carbon atoms, $R_2$ and $R_3$ each are hydrogen, an alkyl having 1 to 8 carbon atoms or an aryl.

3 Claims, No Drawings

MAGNETIC RECORDING MEDIUM COMPRISING MAGNETIC PARTICLES AND A BINDER AND A DIOXOLANE ESTER LUBRICANT

FIELD OF INDUSTRIAL APPLICATION

The present invention relates to a magnetic recording medium, and more particularly, to a magnetic recording medium having good durability.

PRIOR ART

Since the magnetic recording medium vigorously rubs on the magnetic head or pad during recording and reproducing, causing the magnetic layer to wear easily, there has been a demand for an improved one having a magnetic layer which wears less and has better durability than before.

The wear resistance of the magnetic layer has been improved by incorporating or coating the magnetic layer with a lubricant. The lubricant used for this purpose includes higher fatty acids and esters thereof, fatty acid amides, liquid paraffin, and silicone oil. However, they are not necessarily satisfactory for the performance required.

SUMMARY OF THE INVENTION

The present inventors carried out extensive studies on a magnetic recording medium which has greatly improved durability owing to good lubricating ability. The results of the studies led to the present invention.

The magnetic recording medium of the invention comprises a non-magnetic substrate and a magnetic recording layer, coated on the substrate, said layer comprising a compound having the formula (1):

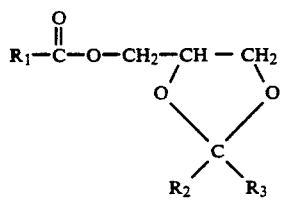 (1)

in which R1 is an alkyl having 11 to 31 carbon atoms, R2 and R3 each are hydrogen, an alkyl having 1 to 8 carbon atoms, or an aryl.

DETAILED DESCRIPTION OF THE PREFERRED EMBODIMENTS

In compound (1) it is preferable that R1 is an alkyl having 13 to 21 carbon atoms, R2 and R3 each are hydrogen, methyl, ethyl or an aryl such as phenyl and a phenyl having a lower alkyl substituent. The magnetic recording layer comprises 100 parts by weight of a magnetic material, 0.05 to 15 parts by weight of the compound (1) and a binder.

The compound represented by the general formula (1) (which will be referred to as the compound (1) hereinafter) contains a group represented by $R_1$ which is a $C_{11\text{-}31}$ alkyl group, and preferably a $C_{13\text{-}21}$ alkyl group, more preferably a $C_{15\text{-}17}$ alkyl group. $R_1$ may be a straight-chain group or branched-chain group, and it may also be a saturated group or unsaturated group.

The compound (1) also contains groups represented by $R_2$ and $R_3$ each of which denotes a hydrogen atom, a $C_{1\text{-}8}$ alkyl group (preferably a $C_{1\text{-}2}$ hydrocarbon group, an aryl group or a hydrogen atom), or an aryl group.

The compound (1) is obtained by the ordinary esterification reaction of a fatty acid represented by the formula (2) below $$R_1\text{—COOH} \quad (2)$$

with an alcohol represented by the formula (3) below.

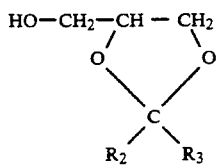 (3)

The alcohol represented by the general formula (3) can be readily obtained by the reaction of a ketone or aldehyde represented by the general formula (4) below

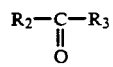 (4)

with glycerin, according to the process described in Org. Synth., III, 502 (1955).

According to the present invention, the compound (1) should be added in an amount of 0.05-15 parts by weight for 100 parts by weight of the magnetic powder. If necessary, it may be used in combination with other general-purpose lubricants, which include esters such as butyl stearate, fatty acids such as oleic acid, and hydrocarbons such as squalane.

The compound (1) may be previously incorporated into the coating material or applied, in the form of solution in a general-purpose solvent such as isopropanol and hexane, to the magnetic coating film, followed by drying. The coating method may also be used for the magnetic recording medium having a magnetic layer formed by sputtering or vapor deposition on a non-magnetic substrate.

The magnetic recording medium of the present invention contains magnetic powder of various types, which include metal oxide in the form of fine needles such as $\gamma\text{-Fe}_2\text{O}_3$, $\text{Fe}_3\text{O}_4$, and $\text{CrO}_2$; processed $\gamma\text{-Fe}_2\text{O}_3$ such as Co-coated $\gamma\text{-Fe}_2\text{O}_3$ and Co-doped $\gamma\text{-Fe}_2\text{O}_3$; metallic iron powder; barium ferrite in the form of fine plates, with Fe atoms partly replaced by Ti, Co, Zn, V, Nb, etc. alone or in combination; and ultrafine powder of metal and alloy such as Co, Fe-Co, and Fe-Ni.

Metallic iron powder may be incorporated or surface-treated with a small amount of nickel, cobalt, titanium, silicon, or aluminum in the form of metal, salt, or oxide, for the improvement of its chemical stability. In addition, the metallic iron powder may be treated in a weak oxidative atmosphere to form a thin oxide film thereon for the improvement of its chemical stability. The above-mentioned magnetic powders may be used in combination with one another.

The magnetic powder is dispersed into a binder to form the magnetic layer. Examples of the binder include polyurethane, polyvinyl chloride, vinyl chloride-vinyl acetate copolymer, polyacrylonitrile, nitrile rubber, epoxy resin, alkyd resin, polyamide, polyacrylic ester, polymethacrylic ester, polyvinyl acetate, polyvinyl butyral, vinylidene chloride, nitrocellulose, maleic acid-modified vinyl chloride-vinyl acetate copolymer, and ethyl cellulose. They may be used alone or in combination with one another. The binder may be used in combination with a plasticizer or hardener for the adjustment of hardness of the magnetic layer.

The magnetic layer of the magnetic recording medium of the present invention may be incorporated with commonly used additives such as abrasive and antistatic agent, in addition to the above-mentioned components.

The magnetic recording medium of the present invention may be formed on a non-magnetic substrate which is prepared from polyesters (such as polyethylene terephthalate), polyolefins (such as polyethylene and polypropylene), cellulose derivatives (such as cellulose triacetate and cellulose diacetate), polycarbonate, polyvinyl chloride, polyimide, and aromatic polyamide. The non-magnetic substrate may also be prepared from a metal (such as aluminum and copper) and paper. The non-magnetic substrate may be in the form of film, tape, sheet, disc, card, or drum. The non-magnetic substrate may have a surface which has been treated with corona discharge, radiation, or UV light, or coated with a proper resin.

EXAMPLES

The invention will be described in more detail with reference to the following examples, which are not intended to restrict the scope of the invention.

EXAMPLES 1 TO 4

A mixture of the following composition was prepared by mixing in a sand mill for 10 hours, followed by filtration.

| | |
|---|---|
| Metallic iron powder | 100 pbw |
| vinyl chloride-vinyl acetate copolymer*[1] | 11 pbw |
| Polyurethane resin*[2] | 11 pbw |
| Carbon black (antistatic agent) | 2 pbw |
| $Cr_2O_3$ (abrasive) | 10 pbw |
| Toluene | 71 pbw |
| Methyl ethyl ketone | 71 pbw |
| Cyclohexanone | 107 pbw |

*[1] "VAGH", a product of Union Carbide Corp.
*[2] "N-2301", a product of Nippon Polyurethane Co., Ltd.

The mixture was mixed with 4.4 parts by weight of hardener, and the resulting binder was applied to both sides of a 32-μm thick polyethylene terephthalate film such that the magnetic layer after drying was 4 μm thick. After drying, the coated film was wound up, followed by calendering and caring. Finally, the coated film was punched into disc, and each disc was coated with an isopropanol solution containing 2.0 wt. % of the lubricant shown in Table 1. The coating weight of the lubricant was 600 mg/m².

TABLE 1

| Example No. | Lubricant |
|---|---|
| Example 1 | $R_{17}H_{35}$—C(=O)—O—CH$_2$—CH—CH$_2$ with O,O linked to C(CH$_3$)$_2$ (cyclic acetal) |
| Example 2 | $R_{17}H_{33}$—C(=O)—O—CH$_2$—CH—CH$_2$ with O,O linked to C(CH$_3$)$_2$ |
| Example 3 | $R_{17}H_{35}$—C(=O)—O—CH$_2$—CH—CH$_2$ with O,O linked to CH(phenyl) |
| Example 4 | $R_{17}H_{33}$—C(=O)—O—CH$_2$—CH—CH$_2$ with O,O linked to CH(phenyl) |

COMPARATIVE EXAMPLES 1 TO 4

The same procedure as in Examples 1 to 4 was repeated to prepare sample discs, except that the lubricants were replaced by those which are shown in Table 2.

TABLE 2

| Comparative Example No. | Lubricant |
|---|---|
| 1 | Oleic acid |
| 2 | 2-Ethylhexyl stearate |
| 3 | Squalane |
| 4 | Tridecyl stearate |

TEST EXAMPLES

The disc samples obtained in Examples 1 to 4 and Comparative Examples 1 to 4 were examined for durability in the following manner. Each disc sample was placed in a case with non woven fabric, and the assembly was mounted on a recording-reproducing unit. The disc was run continuously at a peripheral speed of 7 m/sec, with the head fixed on the same track. The magnetic layer was visually inspected for damage after a certain number of passes. The results are shown in Table 3.

TABLE 3

| Example No. (Comparative Example No.) | After 200,000 passes | After 1,000,000 passes | After 5,000,000 passes |
|---|---|---|---|
| 1 | Not damaged | Not damaged | Not damaged |
| 2 | Not damaged | Not damaged | Not damaged |
| 3 | Not damaged | Not damaged | Not damaged |
| 4 | Not damaged | Not damaged | Not damaged |
| (1) | Slightly damaged | Badly damaged | Unmeasurable |
| (2) | Not damaged | Slightly dam- | Slightly dam- |

TABLE 3-continued

| Example No. (Comparative Example No.) | After 200,000 passes | After 1,000,000 passes | After 5,000,000 passes |
| --- | --- | --- | --- |
| (3) | Slightly damaged | Badly damaged aged | Unmeasurable aged |
| (4) | Slightly damaged | Damaged | Badly damaged |

I claim:

1. A magnetic recording medium, which comprises a non-magnetic substrate and a magnetic recording layer comprising magnetic particles and a binder, coated on said substrate, said magnetic recording layer comprising a compound having the formula (1):

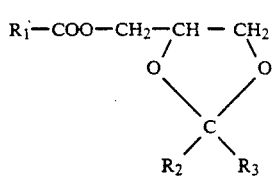

wherein $R_1$ is an alkyl having 11 to 31 carbon atoms; $R_2$ and $R_3$ each are hydrogen, an alkyl having 1 to 8 carbon atoms, or an aryl.

2. The medium as claimed in claim 1, wherein in compound 1, R1 is an alkyl having 13 to 21 carbon atoms, R2 and R3 each are hydrogen, methyl, ethyl or an aryl.

3. The medium as claimed in claim 1, wherein said magnetic recording layer comprises 100 parts by weight of a magnetic material, 0.05 to 15 parts by weight of said compound 1 and a binder.

* * * * *